May 29, 1934.          G. O. DOUGHERTY          1,960,619
FLUID FLOW CONTROL VALVE
Filed April 1, 1931
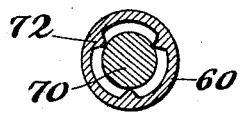
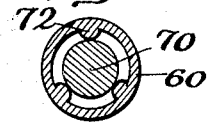
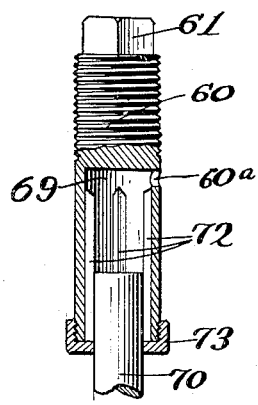
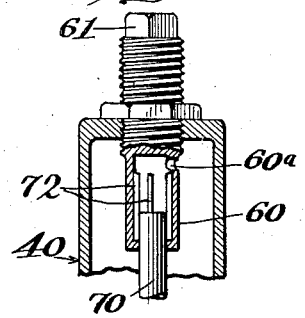
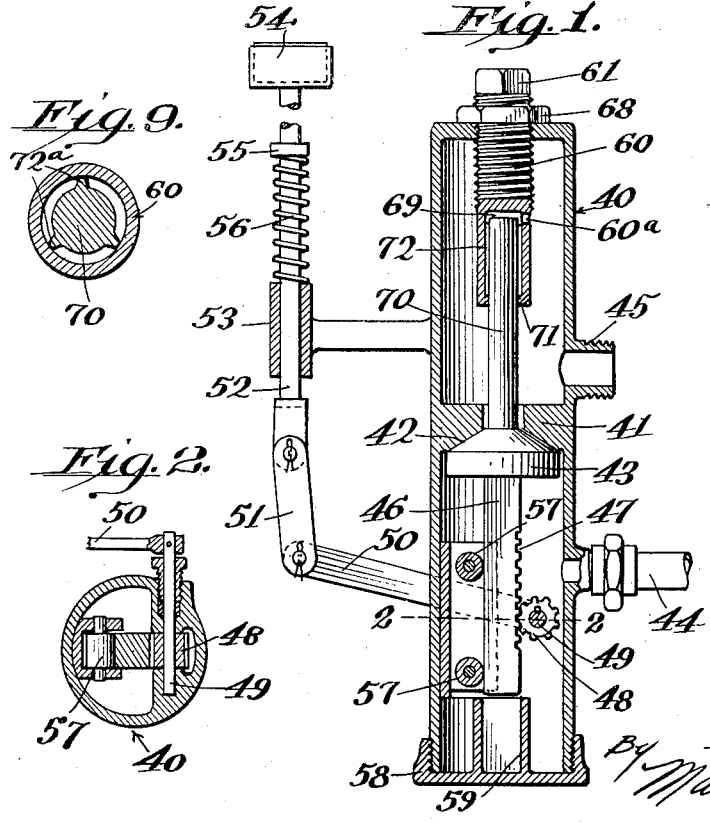
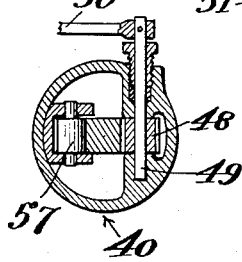
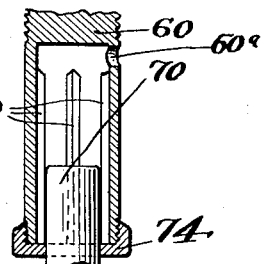
Inventor:
Glenn O. Dougherty Patented May 29, 1934

1,960,619

UNITED STATES PATENT OFFICE 1,960,619

FLUID FLOW CONTROL VALVE

Glenn O. Dougherty, Los Angeles, Calif.

Application April 1, 1931, Serial No. 526,846

9 Claims. (Cl. 251—138)

My invention relates generally to fluid flow control valves and more particularly to a valve that is designed for use in controlling the flow of water to wash basins, bathtubs, sinks, stationary wash tubs, toilet flushing tanks and the like and the principal objects of my invention are, to generally improve upon and simplify the construction of the existing forms of fluid flow control valves and to provide a fluid flow control valve that is relatively simple in construction, inexpensive of manufacture and which may be conveniently operated by means of a pedal, lever or push rod for the unseating of a valve member that normally closes a port or opening that is located in a fluid flow duct or passageway.

A further object of my invention is, to provide an adjustable member for controlling the length of time of the closing movement of the valve, thus making the valve structure adaptable as a flush valve, which may be opened quickly and which closes with a relatively slow movement so as to permit flushing water to flow for a predetermined interval.

A further object of my invention is, to provide the fluid flow control device with non-corrodible guides and bearings for the stem of the valve.

With the foregoing and other objects in view, my invention consists in certain novel features of construction and arrangement of parts that will hereinafter be more fully described and claimed and illustrated in the accompanying drawing in which:

Fig. 1 is a vertical section taken through the center of the valve and showing the same equipped with an adjustable member for automatically controlling the closing movement of the valve.

Fig. 2 is a horizontal section taken on the line 2—2 of Fig. 1.

Fig. 3 is a vertical section taken through the upper portion of the valve housing and showing the valve closing control member in elevated position.

Fig. 4 is a side elevational view partly in section of a modified form of the valve closing control member.

Fig. 5 is a vertical section taken through the lower portion of a further modified form of the valve closing control member.

Figs. 6, 7 and 8 are horizontal sections taken through the lower portions of the valve closing control members and showing different forms of guides or bearing ribs for the valve stems.

Fig. 9 is a cross section similar to Figs. 6, 7 and 8 and showing a modified construction.

Referring by numerals, to the accompanying drawing, a housing 40 is provided intermediate its ends with an internally arranged flange 41 on the underside of which is formed a conical seat 42 for a valve 43 and communicating with the chamber 60 below flange 41 is a fluid supply pipe 44.

Leading from the chamber above flange 41 is an outlet connection 45.

Depending from valve 43 is a stem 46 provided on one side with a series of teeth 47 that are engaged by a pinion 48. This pinion is carried by a horizontally disposed shaft 49 that is journaled in suitable bearings and secured to the end of said shaft that projects outside the valve housing is an arm 50 to the end of which is pivotally connected the lower end of a link 51 and the upper end of the latter is pivotally connected to the lower end of plunger 52. This plunger is mounted for sliding movement in a bearing 53 and carried by the upper end of said plunger is a button 54.

Interposed between bearing 53 and a collar or shoulder 55 on plunger 52 is an expansive coil spring 56 that normally holds the plunger at its upper limit of movement.

Arranged within the valve housing and on the opposite side of stem 46 from shaft 49 and pinion 48 are roller bearings 57 against which set stem engages during its vertical movement.

The lower end of valve housing 40 is closed by a removable cap 58 and projecting upwardly from the center thereof is a tube 59 open at its upper end and which serves as a guide and bearing for the lower portion of stem 46 as the same is moved downwardly to unseat valve 43.

Screw seated in the top of valve housing 40 is a plug 60, the upper end of which is provided with wrench receiving surfaces 61 and mounted on the upper portion of said plug and adapted to bear on top of the valve housing is a lock nut 68.

Formed in the lower portion of plug 60 is an axial recess 69, which is slightly larger in diameter than a stem 70 that projects upwardly from valve 43 and formed through the upper portion of the wall of the plug surrounding this recess is a relatively small aperture 60ᵃ.

Formed on the lower end of the plug 60 and fitting snugly around stem 70 is a flange 71 and formed on the interior of the wall surrounding recess 69 and extending upwardly from said flange 71, are vertically disposed ribs 72 that serve as guides and bearings for the upper portion of stem 70 as it moves vertically through recess 69. These combined guides and bearing ribs 72 may be V-shape in cross section, as illustrated in Fig. 6, or half round, as illustrated in Fig. 7, or approximately square, as illustrated in Fig. 8.

If desired the bearing ribs 72 may be formed separate from the wall of the plug surrounding the recess 69 and the lower ends of said bearing ribs being formed integral with a cap or collar 73 that is screw-seated on the lower end of the plug, as illustrated in Fig. 5 and which cap or collar fits snugly around the valve stem 70.

This construction enables the ribs 72 to be formed of non-corrodible metal or to be plated with non-corrodible substance and which construction eliminates corrosion between the plunger 70 and the plug 60.

In Fig. 5, I have illustrated a construction wherein a cap or collar 74 is screw-seated on the lower end of the wall surrounding the recess 69 and in this construction the inwardly projecting flange of the cap or collar performs the functions of the flange 71.

In the operation of this form of valve, downward pressure on button 54 against the resistance offered by spring 56, will swing arm 50 downward, thereby partially rotating pinion 48 and through its engagement with the teeth 47 on stem 46, the latter, together with valve 43 and stem 70 will be moved downward, consequently unseating valve 43 and permitting water or other fluid to flow from supply pipe 44 upwardly past valve 43 and from thence to and through outlet 45.

As the upper portion of stem 70 is thus moved downward in chamber 69, water will enter said chamber through aperture 60ª and when pressure is removed from button 54 and the actuated parts return to their normal positions as a result of the expansive action of spring 56, the upward movement of the valve will be retarded due to the restricted flow of water from chamber 69 out through aperture 60ª and which outward flow of water is brought about by the upward travel of stem 70 in recess 69.

Thus the closing of the valve 43 is retarded and water will flow through the valve for a predetermined period or until practically all the water has been expelled from chamber 69 through outlet aperture 60ª.

The closing movement of valve 43 or its return to its seat 42 may be very accurately controlled by screwing plug 60 upwardly or downwardly through the upper end of housing 40 and consequently varying the position, of recess 69 so that a greater or less amount of water must be displaced by the upper portion of stem 70 in passing upwardly into chamber 69 until valve 43 is fully closed.

In order to permit the chamber within the plug 60 to rapidly fill with water, said plug may be adjusted in the upper end of the housing 40 so that when stem 70 is moved downward to its limit of movement, its upper end is wholly withdrawn from the lower end of said plug and when such action occurs water will flow freely into the opening in the lower end of said plug and also through the aperture 60ª, thus filling the chamber in the plug in much less time than if water is permitted to enter only through the aperture 60ª.

Plug 60 may be secured in its adjusted position by means of the lock nut 68.

In the construction illustrated in Fig. 9, combined guide and bearing ribs 72ª are formed on valve stem 70 instead of on the wall of the plug 60 that encloses the chamber 69. Such construction is just the reverse of the construction illustrated in Figs. 6 to 8 inclusive.

The adjustable plug in the upper end of the valve housing and which is equipped with a chamber that receives the upper end of a valve stem is highly effective in controlling the closing movement of the valve that is carried by the stem and consequently the flow of fluid past the valve while the same in closing may be very accurately regulated.

The combined bearing and guiding ribs that are arranged within the chamber into which the upper end of the valve stem projects minimizes the surface contact between the valve stem and the plug and consequently the liability of the parts becoming inoperative, due to corrosion between said parts is minimized.

It will be understood that minor changes in the size, form and construction of the various parts of my improved fluid flow control valve may be made and substituted for those herein shown and described without departing from the spirit of my invention, the scope of which is set forth in the appended claims.

I claim as my invention:

1. In a fluid flow control valve, a housing provided with inlet and outlet openings, a port arranged between said openings, a valve normally closing said port, a stem upon which said valve is carried, a longitudinally adjustable recessed member seated in the valve housing for receiving one end of the valve stem for controlling the closing movement of the valve and which recessed member is provided in its wall with an opening to permit fluid to enter and discharge from the recess in said member.

2. In a fluid flow control valve, a housing provided with inlet and outlet openings, a port arranged between said openings, a valve normally closing said port, a stem upon which said valve is carried, a longitudinally adjustable member seated in the valve housing and provided with a recess for the reception of the end of the valve stem and said recess having an outlet opening.

3. In a fluid flow control valve, a housing provided with inlet and outlet openings, a port arranged between said openings, a valve normally closing said port, a stem upon which said valve is carried, a longitudinally adjustable member seated in the valve housing and provided with a recess for the reception of the end of the valve stem, said recess having an outlet opening and valve stem guides arranged within said recess.

4. In a fluid flow control valve, a housing provided with inlet and outlet openings, a port within said housing between said openings, a valve normally closing said port, a stem upon which said valve is mounted, means for imparting movement to said stem to unseat said valve, a longitudinally adjustable plug seated in the valve housing and provided with a recess for the reception of one end of the valve stem, combined bearing and guiding ribs arranged between the plug and valve stem and the upper end of the recess in said plug being provided with a fluid inlet and outlet opening.

5. In a fluid flow control apparatus, the combination with a valve housing, of a valve and its stem arranged for operation within said housing, means for actuating said valve to unseat same, a longitudinally adjustable member adapted to receive one end of the valve stem, said member having a stem receiving recess and said recess being provided with a fluid inlet and outlet aperture.

6. In a fluid flow control apparatus, the combination with a valve housing, of a valve and its stem, arranged for operation within said valve housing, means for actuating said valve to unseat same, a longitudinally adjustable member adapted to receive one end of the valve stem, said member having a stem receiving recess, said recess being provided with a fluid inlet and outlet aperture and combined guide and bearing ribs for the valve stem arranged within said recess.

7. In a fluid flow control valve, a housing provided with inlet and outlet openings, a port within said housing between said openings, a valve stem arranged for operation through said port, a valve carried by the intermediate portion of said stem for normally closing said port, a longitudinally adjustable member seated in the upper portion of the valve housing and provided with a recess for the reception of the upper portion of the valve stem, said recess having a fluid inlet and outlet opening, a tubular bearing in the lower portion of the housing for receiving the lower portion of the valve stem when the same is moved downward to its limit of movement and means for imparting downward movement to said valve stem.

8. In a fluid flow control valve as set forth in claim 7 and with anti-friction bearings arranged within the valve housing for engaging the lower portion of the valve stem during its vertical movement.

9. In a fluid flow control valve as set forth in claim 7, with teeth formed on the lower portion of the valve stem, a pinion for engaging said teeth, means for imparting rotary motion to said pinion and anti-friction bearings arranged within the lower portion of the valve housing for engaging the lower portion of the valve stem on the opposite side from said pinion.

GLENN O. DOUGHERTY.